(12) United States Patent
Froschauer et al.

(10) Patent No.: US 7,326,050 B2
(45) Date of Patent: Feb. 5, 2008

(54) INJECTION MOULDING MACHINE WITH A SUBSTANTIALLY C-SHAPED MACHINE FRAME

(75) Inventors: Franz Froschauer, Naarn im Machlande (AT); Gerhard Wimbauer, Schwertberg (AT)

(73) Assignee: Engel Austria GmbH, Schwertberg (AT)

( * ) Notice: Subject to any disclaimer, the term of this patent is extended or adjusted under 35 U.S.C. 154(b) by 35 days.

(21) Appl. No.: 11/387,531

(22) Filed: Mar. 23, 2006

(65) Prior Publication Data
US 2006/0222733 A1 Oct. 5, 2006

(30) Foreign Application Priority Data
Mar. 30, 2005 (AT) ............................. A 531/2005
Mar. 30, 2005 (AT) ............................. A 532/2005

(51) Int. Cl.
*B29C 45/64* (2006.01)
(52) U.S. Cl. .................. 425/595; 100/231; 100/258 A; 425/451.9
(58) Field of Classification Search ................ 425/595, 425/451.9; 100/231, 258 A
See application file for complete search history.

(56) References Cited

U.S. PATENT DOCUMENTS 5,556,656 A * 9/1996 Lampl et al. ............. 425/451.9
5,762,984 A * 6/1998 Wimbauer ................... 425/595
5,783,231 A * 7/1998 Fuller et al. .............. 425/451.9
5,922,370 A * 7/1999 Ziv-Av ........................ 425/595
6,068,463 A * 5/2000 Urbanek ..................... 425/595
6,113,383 A * 9/2000 Urbanek et al. ............ 425/595
6,186,771 B1 * 2/2001 Damkjaer ................... 425/595

FOREIGN PATENT DOCUMENTS

| EP | 0 311 133 | 4/1989 |
| EP | 0 850 129 A1 | 7/1998 |
| EP | 1 001 872 A1 | 5/2000 |
| WO | WO97/28946 | 8/1997 |

\* cited by examiner

Primary Examiner—James P. Mackey
(74) Attorney, Agent, or Firm—Notaro & Michalos P.C.

(57) ABSTRACT

An Injection moulding machine with substantially C-shaped machine frames including a joint part arranged between at least one die platen and the machine frame, the joint part comprising a beam extending in the longitudinal direction of the machine which is deformed upon application of a clamping force such that the at least one die platen is tilted relative to the associated side of the machine frame, the support of said beam effected substantially by at least two spaced support surfaces which are arranged above and below the midplane of the at least one die platen whose vertical position may be associated with the elastic deformation of the joint part by means of an adjustable abutment and extending the at least one die platen at an angle to the vertical.

8 Claims, 8 Drawing Sheets

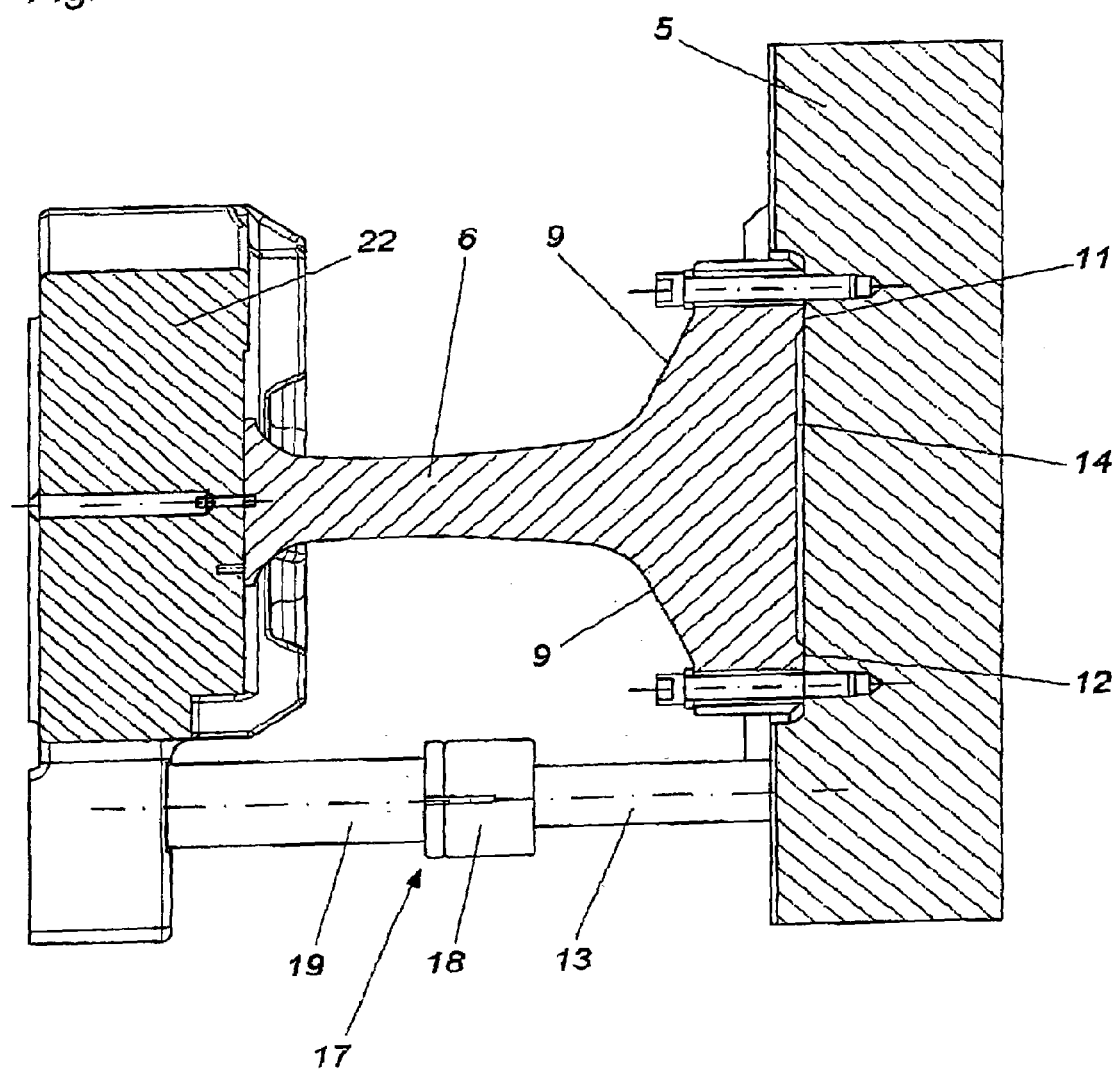

Figure 1:
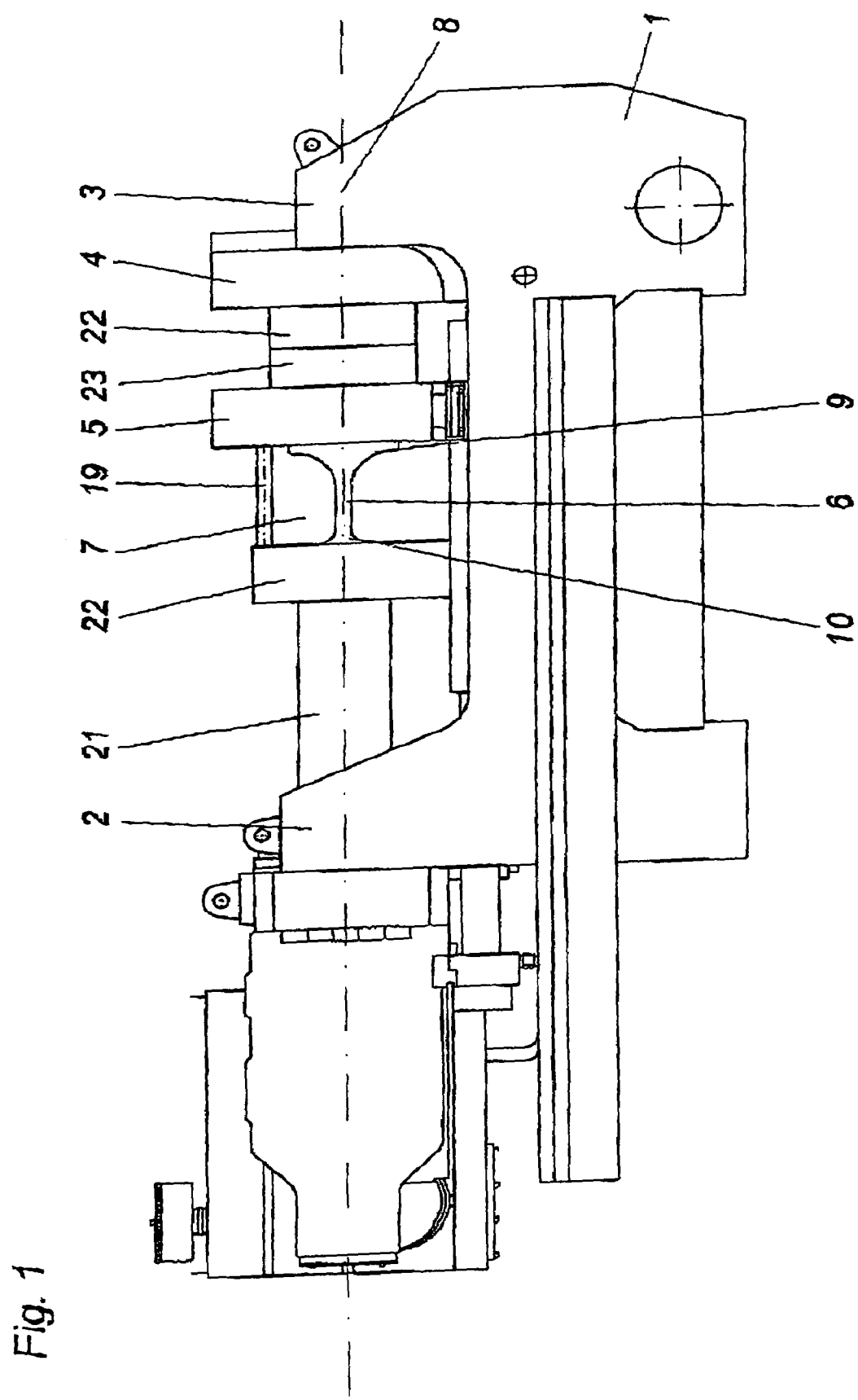

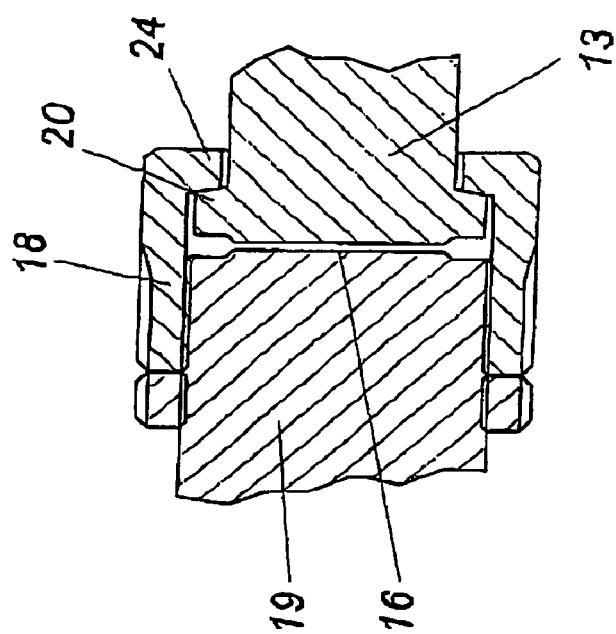
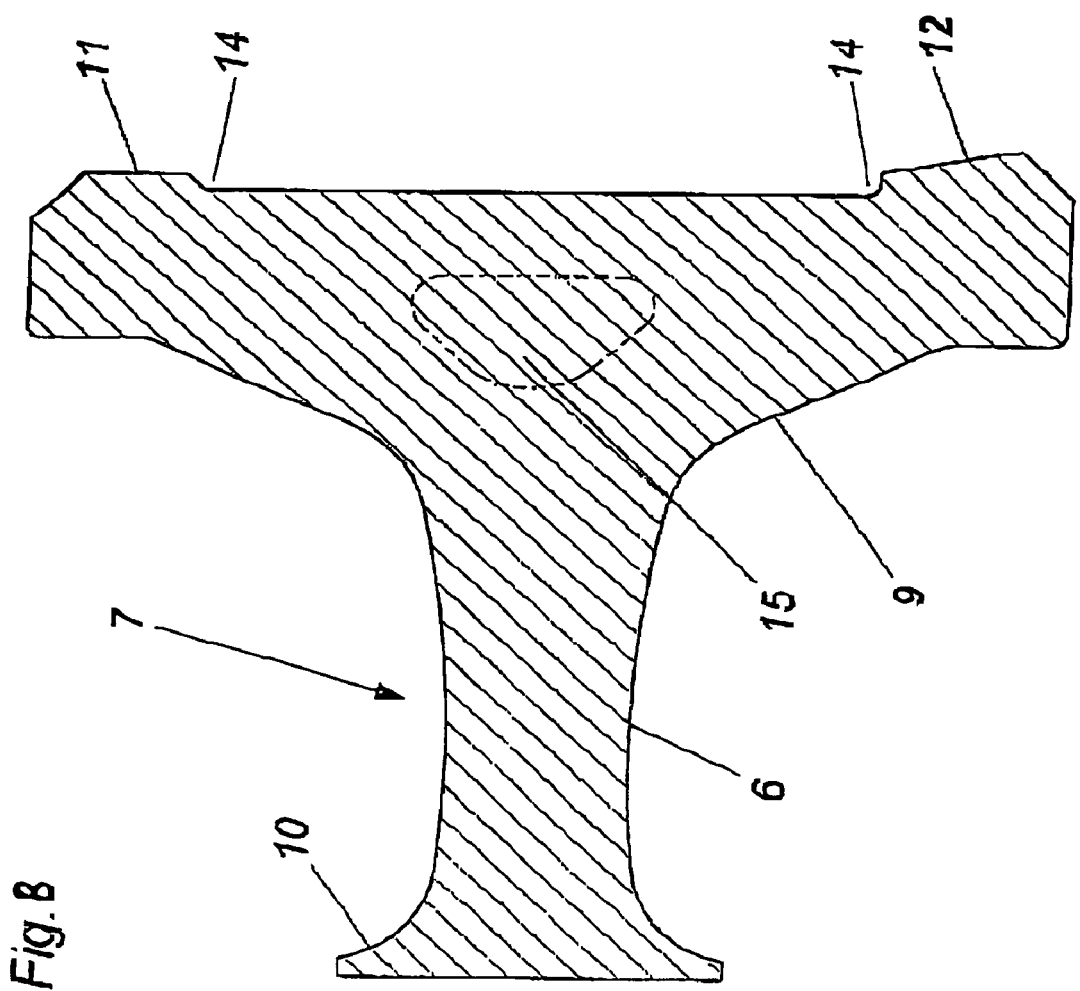

INJECTION MOULDING MACHINE WITH A SUBSTANTIALLY C-SHAPED MACHINE FRAME

DESCRIPTION

The invention relates to an injection-moulding machine with a substantially C-shaped machine frame, at one side of which is mounted a fixed die platen, and at the other side of which is mounted a clamping mechanism for driving a movable die platen, wherein the free ends of the sides of the machine frame not connected by bars deform under the influence of the clamping force occurring during the clamping process, and wherein a joint part is arranged between at least one die platen and the machine frame and comprises a beam extending in the longitudinal direction of the machine which is deformed upon application of the clamping force, whereby the die platen is tilted relative to the associated side of the machine frame.

Devices of this kind, which have set the standard for bar-less injection-moulding machines for approximately a decade, are marketed with a joint part called Flexlink (see WO 98/02291) by the applicant. The clamping force introduced into the die platen by the joint part has a single maximum approximately in the midplane of the die platen, as defined by height.

With die platens whose vertical extent is very great compared with that of the joint part, difficulties can result if there are vertically pronounced mould cavities. In order to distribute the corresponding moment acting about the horizontal transverse axis, it has already been proposed (cf. WO 97/28946) to attach the deformable joint parts to the upper edges of the die platens. However, with such a design, it must be ensured that the lower edges of the die platen move exactly as far in longitudinal direction of the machine when the clamping force is applied as do the free sides of the C-frame or the flectors. The bars or pressure rods which are intended to effect this movement of the lower plate edges require a considerable structural outlay and it is difficult to match the extension of these elements to the spread of the frame leg under different clamping forces.

The invention solves this described problem very simply in structural terms by providing that the support of the beam on the die platen is effected substantially by two support surfaces spaced apart from each other which are arranged above and below the midplane of the die platen, as defined by height.

The basic design of bar-less injection-moulding machine is described in EP 0 311 133. It is a machine in which one mould half is jointly pivoted with one side of the machine frame and the second mould half can follow this movement due to a joint arranged behind the die platen. The joint described in EP 0 311 133 is a standard joint with journals. The vertical orientation of the die platen attached thereto is already, as with the machines with flector described later in WO 98/02291, effected by a compression spring cooperating with an abutment.

The combination of spring and abutment described in EP 0 311 133 serves to prevent a pivoting of the die platen when the mould is open. The pivoting necessary to keep the plates parallel takes place only under the influence of the clamping force which easily overcomes the spring force.

The combination of spring and adjustable abutment known from EP 0 311 133 was adopted unchanged in the machines with flector known from WO 98/02291. The flectors introduced in WO 98/02291 are intended in fact to offer the lowest possible resistance to a deflection if a gaping of the mould through these joints is to be avoided. In this sense, it initially seemed inappropriate to also provide a beam effecting the pivoting with the function of the spring which is necessary to keep the open mould vertical.

This leads to the idea that the deformable beam transmitting the clamping force must at any rate be sufficiently large to reliably prevent it from collapsing. In this respect it makes no great difference whether the force necessary for the vertical adjustment of the open die, which is one order of magnitude higher than the clamping force, is added to the clamping force.

Starting from the above considerations the function of the spring required up to now to keep the die platen vertical is taken over by the deformable beam of the joint part. This is achieved in that, when the joint part is not deformed, the die platen extends at a slight angle, the vertical position thus being associated with elastic deformation of the joint part.

Figure 2:
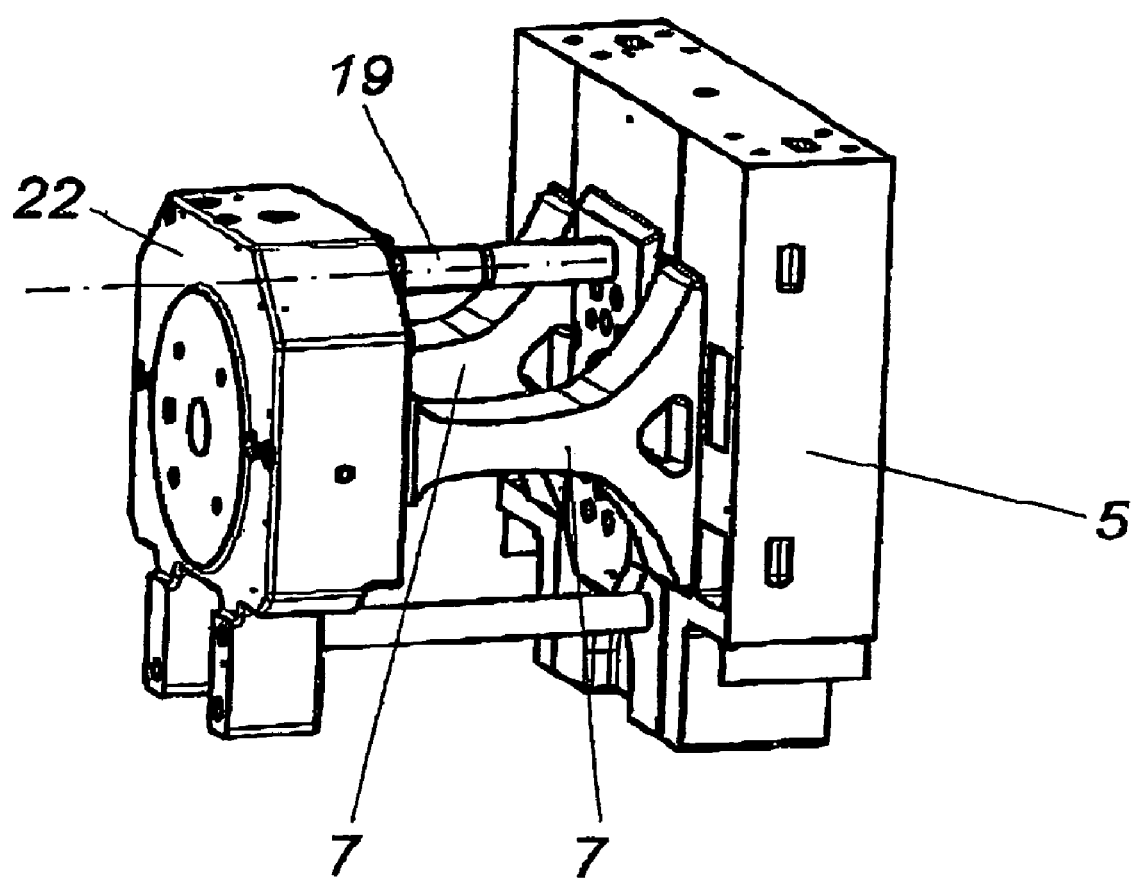

Details of the invention are explained below with the aid of the drawings in which FIG. 1 shows the schematic side view of an injection-moulding machine with C-frame, FIG. 2 shows an illustrative representation of the joint according to the invention, and FIG. 3a, 3b show a side view and a detail in section along the line A-A.

Figure 3:
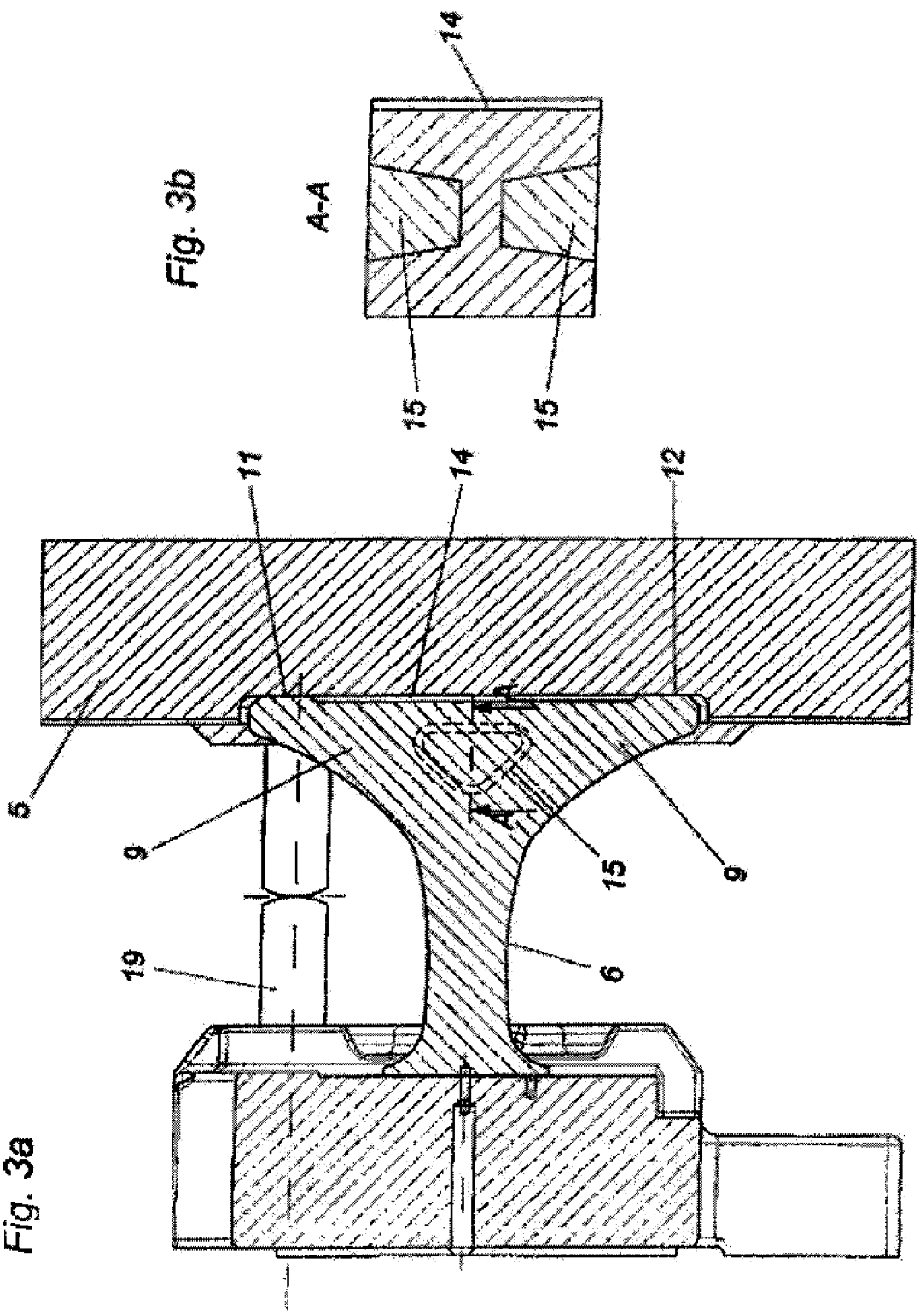
Figure 4:
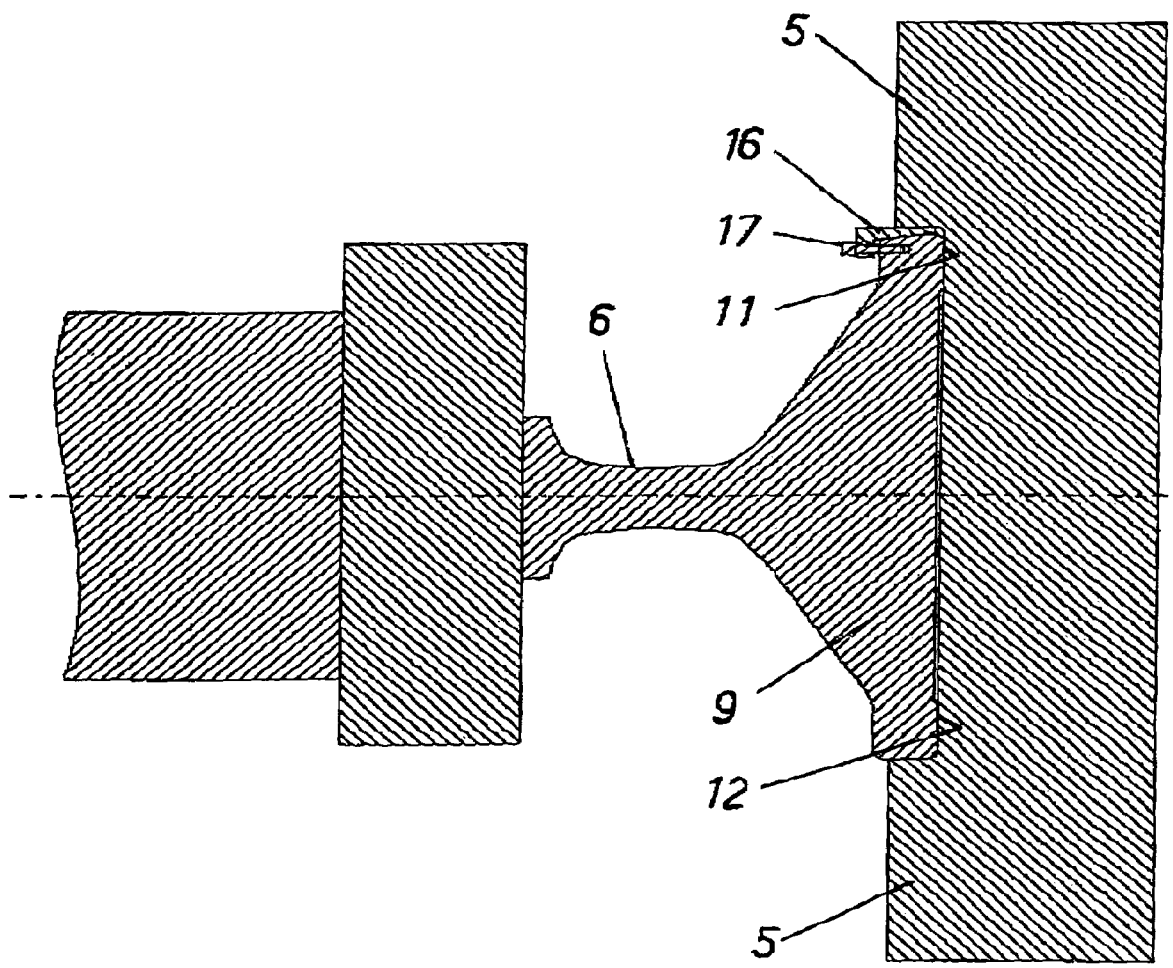

FIG. 4 an addition to FIG. 3a, some details of FIG. 3a being omitted.

Figure 5:
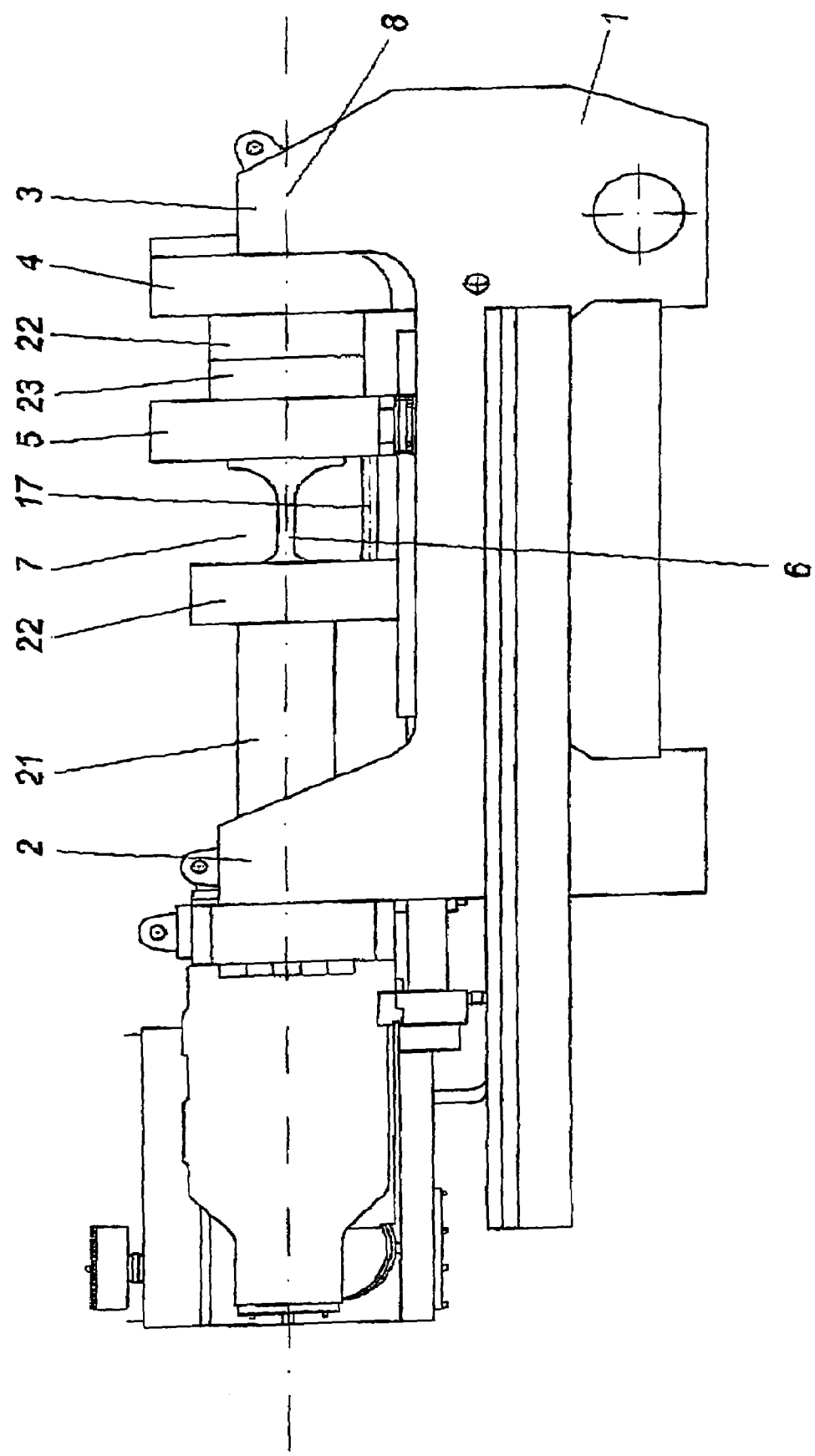
Figure 6:
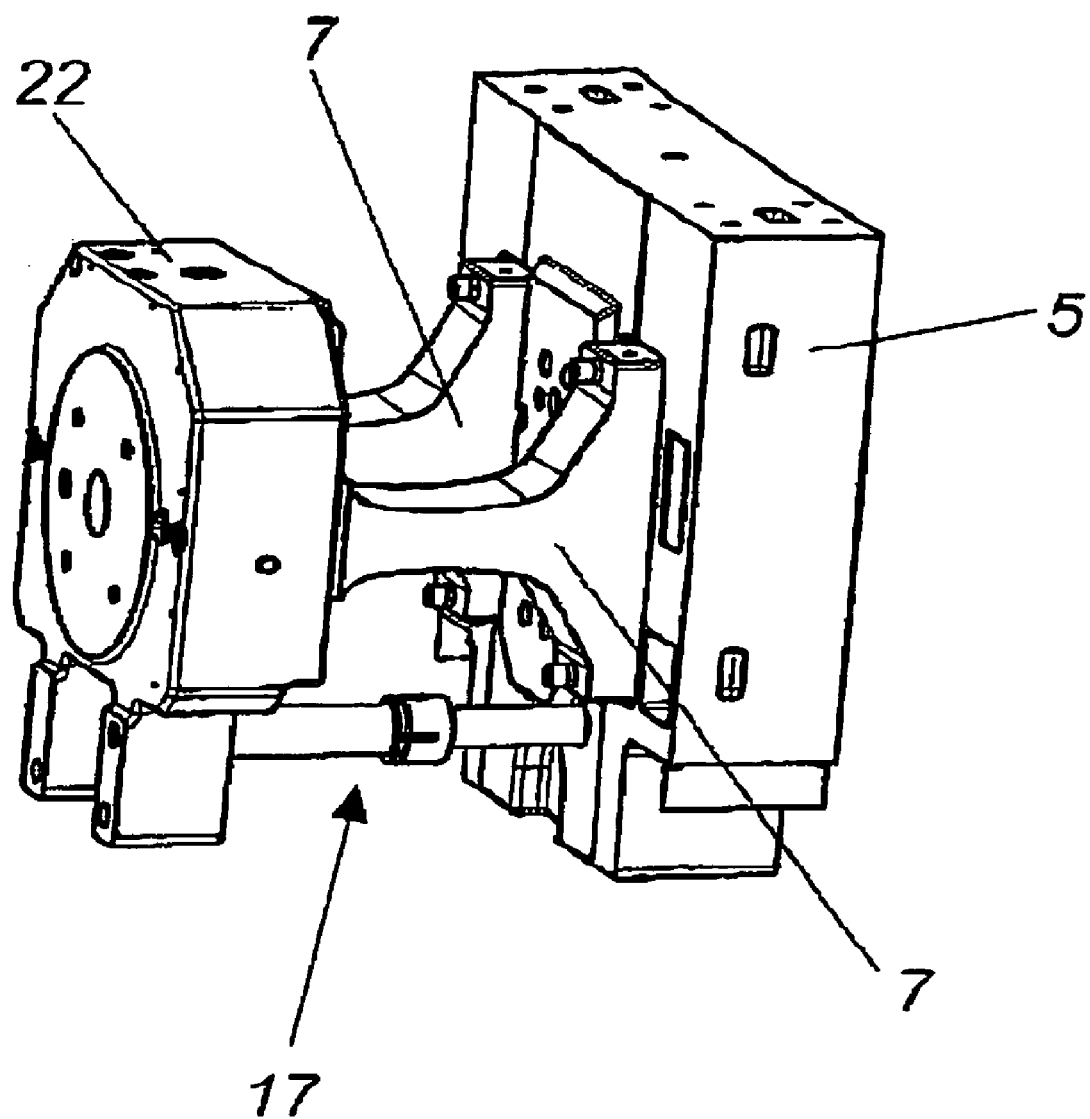

FIG. 5 shows the schematic side view of a second embodiment of an injection-moulding machine with C-frame, FIG. 6 shows an illustrative representation of a joint according to the invention, FIG. 7 shows a side view of the joint, FIG. 8 shows an alternative form of the support surfaces of the Joint part, not shown to scale, and FIG. 9 shows a section through the central region of the rod 17 of FIGS. 6 and 7.

The injection-moulding machine shown in FIG. 1 has a machine frame 1, the particular feature of which is that the upwardly-projecting sides 2 and 3 of the machine frame 1 are not connected by bars. The injection of plastic into the mould to be arranged between the fixed die platen 4 and the movable die platen 5 takes place by means of an injection unit, not shown, while the die platens 4, 5 are pressed together for example by a hydraulic clamping mechanism. There is a slight widening of the C-shaped machine frame. In the embodiment shown, it is assumed that the die platen A follows the movement of the side 3, and centrally arranged joint parts 7 allow a pivoting of the die platen 5, with the result that die platens 4 and 5 remain parallel even under the influence of the clamping pressure. The joint parts 7, which are shown in FIGS. 2 and 3 in detail, comprise a longitudinally aligned beam 6 the cross-section of which forms a flat rectangle, This beam 6 widens uniformly in both directions to form flanges 9 and 10 which are connected to the adjoining plates 5 and 22. The midplane 8, which is defined by the centering devices provided on the die platens 4, 5 for the mould halves 22, 23, extends in its entirety in the inside of the beam 6, preferably slightly displaced into its lower half.

FIG. 2 shows in illustrative representation the connection of the plates 5 and 22 by two centrally arranged joint parts 7. A divided pressure rod 19 serves to restrict the pivoting of the die platen 5 about the joint parts 7.

In FIG. 3a It is clearly seen that the clamping force applied by the beam 6 is not introduced at mid-height of the die platen 5, but substantially above and below it by means of the support surfaces 11 and 12. The central area is kept free by a recess on the flange g. Even it this should disappear under the influence of the clamping force, in the design shown the force introduced into the die platen 5 displays two clearly separate maxima.

A particularly small deflection of the die platen 5 results if the upper and lower halves of same are divided approximately in half by the respective support surfaces 11 and 12.

The desired force pattern is to apply compressive stress to the areas between beam 6 and support surfaces 11 and 12, whereas the area of the flange 9 between the support surfaces 11 and 12 serves merely as a draw belt. Accordingly, the pivot area of beam 6 and flange 9 is therefore weakened by recesses 15, as shown in FIG. 3b.

Occasionally, the problem has been observed that the uppermost and lowermost parts of platen 5 are not sufficiently supported by flange 9. This is avoided in the construction shown in FIG. 4. Here flange 9 is embedded in platen 5 as is already the case in FIG. 3a. In addition, however, the construction shown in FIG. 4 provides for a transmission of forces through the upper and lower rim of flange 9 into platen 5. To this effect a wedge-shaped element 16 is arranged in the interspace between flange 9 and platen 5. This element 16 is displaceable along the upper edge of flange 9 by means of screws 17.

The injection-moulding machine shown in FIG. 5 again has a machine frame 1, the particular feature of which is that the upwardly-projecting sides 2 and 3 of the machine frame 1 are not connected by bars. The injection of plastic into the mould to be arranged between the fixed die platen 4 and the movable die platen 5 takes place by means of an injection unit, not shown. While the die platens 4, 5 are pressed together, for example by a hydraulic clamping mechanism. There is a slight widening of the C-shaped machine frame. In the embodiment shown, it is assumed that the die platen 4 follows the movement of the side 3, and centrally arranged joint parts 7 allow a pivoting of the die platen 5, so that die platens 4 and 5 remain parallel even under the influence of the clamping pressure. The joint parts 7, which are shown in FIGS. 6 and 7 in detail, comprise a longitudinally aligned beam 6 the cross-section of which forms a flat rectangle. This beam 6 widens uniformly in both directions to form flanges 9 and 10 which are connected to the adjoining plates 5 and 22. The midplane 8, which is defined by the centering devices provided on the die platens 4, 5 for the mould halves 22, 23, extends in its entirety in the inside of the beam 6, preferably slightly displaced into its lower half.

FIG. 6 shows in illustrative representation the connection of the plates 5 and 22 by two centrally arranged joint parts 7. A rod 17 serves to restrict the pivoting of the die platen 5 about the joint parts 7.

It can be seen in FIG. 7 that the clamping force applied by the beam 6 is not introduced at mid-height of the die platen 5, but substantially above and below it by means of the support surfaces 11 and 12. The central area is kept free by a recess 14 on the flange 19. Even if this should disappear under the influence of the clamping force, in the design shown the force introduced into the die platen 5 displays two clearly separate maxima.

A particularly small deflection of the die platen 5 results if the upper and lower halves of the same are divided approximately in half by the respective support surfaces 11 and 12. It is, therefore, one embodiment of this invention to have the distance between the support surfaces 11 and 12 to be 40 to 50% of the height of the die platen 5.

It is a particular feature of this embodiment that the clamping surface of the die platen 5 is slightly inclined relative to the vertical when the joint part is not deformed. No special design of the die platen itself is necessary for this, rather it is enough that the joint part 7 has a support plane that extends at an angle relative to the non-deformed beam 6 for support against the die platen. The support plans, as FIG. 8 in particular shows, is formed by the two support surfaces 11 and 12, of which support surface 12 projects further in longitudinal direction of the machine than support surface 11. To illustrate this, the support surface 12 together with its surroundings is drawn to an enlarged scale. In reality, the surfaces 11 and 12 lie in one plane.

The tilting of the open mould is corrected primarily by the moment exerted on the joint parts 7 by the die platen 5 and the mould half secured thereto. Whenever this moment remains below the proposed maximum value, the rod 17 shown in more detail in FIGS. 7 and 9 is subjected to tensile stress. The length of this rod is set such that the annular flange 20 on the part-rod 13 rests against the inwardly-projecting flange 24 of the cap nut 18 when the die platen 5 is vertical. The tensile stress applied to the rod 17 results from the flexural stress in the beam 6 which counteracts the moment exerted by the die platen 5.

Upon application of the clamping force, the die platen is turned clockwise out of the vertical, which prevents the gaping of the mould 22, 23. The rod 17 is first relieved of stress, buckling of the joint parts 7 is prevented in that upon further pivoting the part-rod 13 comes to rest against the end-surface 16 of the part-rod 19. If a rod is arranged above the joint part 7 as in the embodiment of FIGS. 1-4, the same function can be achieved (by swapping tensile and compressive stress).

The inventioned claimed is:

1. Injection-moulding machine with a substantially C-shaped machine frame, at one side of which frame is mounted a fixed die platen, said one side having at least one free end, and at the other side of which frame is mounted a clamping mechanism exerting a clamping force for driving a movable die platen, said other side having at least one free end, wherein said free ends of said sides of the machine frame not connected by bars deform under the influence of the clamping force, and wherein a joint part is arranged between at least one die platen and the machine frame and comprises a beam extending in the longitudinal direction of the machine which is deformed upon application of the clamping force, whereby said one die platen is tilted relative to the associated side of the machine frame, the support of the beam on said one die platen being effected substantially by two support surfaces spaced apart from each other which are arranged above and below the midplane of said one die platen, as defined by height of said one die platen.

2. Injection-moulding machine according to claim 1, wherein the support surfaces are attached to a flange which extends transversely to the beam of the joint part and is left free in the region between the support surfaces of the beam by a recess.

3. Injection-moulding machine according to claim 2, wherein the distance between the support surfaces is 40 to 50% of the height of the die platen.

4. Injection-moulding machine according to claim 2, the joint pad having at least one or more second and subsequent recesses in the region connecting the beam and the flange.

5. Injection-moulding machine according to claim 2, the flange being secured in the recess of an abutting die platen against vertical movement by a wedge-like element.

6. Injection-moulding machine with a substantially C-shaped machine frame, at one side of which frame is mounted a fixed die platen, said one side having at least one free end, and at the other side of which frame is mounted a clamping mechanism exerting a clamping force for driving a movable die platen, said other side having at least one free end, wherein said free ends of the sides of said machine frame not connected by bars deform under the influence of the clamping force, wherein a joint part is arranged between at least one die platen and the machine frame and comprises a beam extending in the longitudinal direction of the machine which is deformed upon application of the clamping force, whereby said one die platen is tilted relative to the associated side of the machine frame, and wherein when released said one die platen is pressed by elastic force against an adjustable abutment and thereby kept vertical, wherein, when the joint part is not deformed, said one die platen extends at an angle, the vertical position thus being associated with elastic deformation of the joint part.

7. Injection-moulding machine according to claim 6, the joint part having a support plane extending at an angle relative to the un-deformed beam for support against said one die platen.

8. Injection-moulding machine according to claim 6, wherein the abutment is arranged on a divided rod which has a further abutment, with the result that the pivoting of the said one die platen is limited in both directions.

* * * * *